US009846573B2

(12) United States Patent
Simitsis et al.

(10) Patent No.: US 9,846,573 B2
(45) Date of Patent: Dec. 19, 2017

(54) GENERATING A LOGICAL REPRESENTATION FROM A PHYSICAL FLOW

(71) Applicant: Hewlett-Packard Development Company, L.P., Houston, TX (US)

(72) Inventors: Alkiviadis Simitsis, Santa Clara, CA (US); Kevin Wilkinson, San Mateo, CA (US); Petar Jovanovic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/897,299

(22) PCT Filed: Jun. 24, 2013

(86) PCT No.: PCT/US2013/047252
§ 371 (c)(1),
(2) Date: Dec. 10, 2015

(87) PCT Pub. No.: WO2014/209253
PCT Pub. Date: Dec. 31, 2014

(65) Prior Publication Data
US 2016/0147510 A1 May 26, 2016

(51) Int. Cl.
*G06F 9/44* (2006.01)
*G06F 9/45* (2006.01)

(52) U.S. Cl.
CPC .............. *G06F 8/427* (2013.01); *G06F 8/30* (2013.01); *G06F 8/51* (2013.01); *G06F 8/74* (2013.01)

(58) Field of Classification Search
CPC ... G06F 8/427; G06F 8/30; G06F 8/74; G06F 8/51
See application file for complete search history.

(56) References Cited

U.S. PATENT DOCUMENTS

| 5,930,512 | A | * | 7/1999 | Boden | G06Q 10/06 717/102 |
|---|---|---|---|---|---|
| 6,128,635 | A | * | 10/2000 | Ikeno | G06F 17/30014 707/E17.013 |
| 8,332,864 | B2 | | 12/2012 | Bose et al. | |
| 8,433,673 | B2 | | 4/2013 | Venkatasubramanian et al. | |
| 2008/0028152 | A1 | * | 1/2008 | Du | G06F 9/3802 711/129 |

(Continued)

FOREIGN PATENT DOCUMENTS

| WO | WO-0036500 | 6/2000 |
| WO | WO-03044699 | 5/2003 |
| WO | WO-2012-173355 | 12/2012 |

OTHER PUBLICATIONS

Simitsis, A, et al, "A Mthod for the Mapping of Conceptual Designs to Logical Blueprints for ETL Processes", Feb. 5, 2007.

(Continued)

*Primary Examiner* — Chameli Das (57) ABSTRACT

Described herein are techniques for processing analytic flows. A physical flow can be parsed into multiple elements. A logical representation can be generated based on the physical flow using a dictionary. An engine-specific logical representation or second physical flow can then be generated based on the logical representation using the dictionary.

13 Claims, 7 Drawing Sheets

(56) References Cited

U.S. PATENT DOCUMENTS

| | | | |
|---|---|---|---|
| 2008/0163184 A1* | 7/2008 | Kanade | G06F 8/34 |
| | | | 717/149 |
| 2008/0189683 A1 | 8/2008 | Payette et al. | |
| 2008/0320452 A1 | 12/2008 | Thompson | |
| 2008/0320486 A1* | 12/2008 | Bose | G06Q 10/06 |
| | | | 718/105 |
| 2009/0055624 A1* | 2/2009 | Kirsch | G06F 15/17337 |
| | | | 712/11 |
| 2009/0070786 A1 | 3/2009 | Alves et al. | |
| 2010/0275194 A1 | 10/2010 | Mercer et al. | |
| 2010/0280990 A1 | 11/2010 | Castellanos et al. | |
| 2011/0035205 A1* | 2/2011 | Brideson | G06F 8/35 |
| | | | 703/22 |
| 2011/0106482 A1* | 5/2011 | Adir | G01R 31/318314 |
| | | | 702/119 |
| 2012/0072391 A1 | 3/2012 | Simitsis et al. | |
| 2012/0143589 A1* | 6/2012 | Beale | G06F 9/45516 |
| | | | 703/26 |
| 2012/0151457 A1 | 6/2012 | Gennard et al. | |
| 2012/0259762 A1* | 10/2012 | Tarighat | G06F 8/34 |
| | | | 705/37 |
| 2012/0260252 A1* | 10/2012 | Kuesel | G06F 9/4881 |
| | | | 718/102 |
| 2012/0266133 A1* | 10/2012 | Imai | G06F 11/3608 |
| | | | 717/114 |
| 2013/0081004 A1 | 3/2013 | Vargas et al. | |

OTHER PUBLICATIONS

Extended European Search Report dated Dec. 6, 2016 for EP Application No. 13888068.7; pp. 7.

\* cited by examiner

GENERATING A LOGICAL REPRESENTATION FROM A PHYSICAL FLOW

BACKGROUND

There are numerous execution engines used to process analytic flows. These engines may only accept input flows written in a certain programming language (e.g., PigLatin, Structured Query Language (SQL)) or designed using a certain flow-design tool (e.g., Pentaho Data Integration (PDI) platform). Furthermore, even data analytic engines supporting the same programming language or flow-design tool may provide different implementations of analytic operations and the like, and thus may have engine-specific requirements for an input flow. In today's heterogeneous analytic environments, it can be difficult to manage analytic flows due to these limitations, especially if the analytic flow is a hybrid flow comprising sub-flows directed to different engines.

BRIEF DESCRIPTION OF DRAWINGS

The following detailed description refers to the drawings, wherein.

DETAILED DESCRIPTION

As described herein, a logical analytic flow (referred to herein as a "logical representation") may be generated from one or more physical analytic flows. Physical flows include implementation details such as implementation type, resources, storage paths, etc., and are specific to an execution engine. Physical flows may be written in a particular programming language or may be designed in a particular flow-design tool. A physical flow may also be a hybrid flow, which includes sub-flows directed to different execution engines. In contrast, the generated logical flow may comprise logical operators written in a logical language and may be engine-agnostic, meaning that it is not designed to be run on any specific execution engine.

There are numerous advantages to generating an engine-agnostic logical representation of physical flows. For example, in the case of a hybrid flow, the flow may be more easily understood and managed if written as a single flow in one representation. The hybrid flow may be optimized while in the logical representation, and may be decomposed into different sub-flows more suitable for execution in a given execution environment (which may include multiple heterogeneous engines). Even for non-hybrid flows, generating a logical representation of a physical flow may provide useful abstraction of the flow and may enable conversion of the flow into another physical form for execution on a different execution engine than originally specified.

According to an example, a technique implementing the principles described herein can include parsing a first physical flow associated with at least one execution engine into multiple elements. The first physical flow may be a hybrid flow associated with multiple heterogeneous execution engines. A logical representation of the physical flow may be generated using a dictionary by converting the multiple elements into logical elements represented in a logical language. The dictionary can include a mapping between the logical language and a programming language associated with the at least one execution engine. A second physical flow can then be generated from the logical representation using the dictionary. Additional examples, advantages, features, modifications and the like are described below with reference to the drawings.

Figure 1:
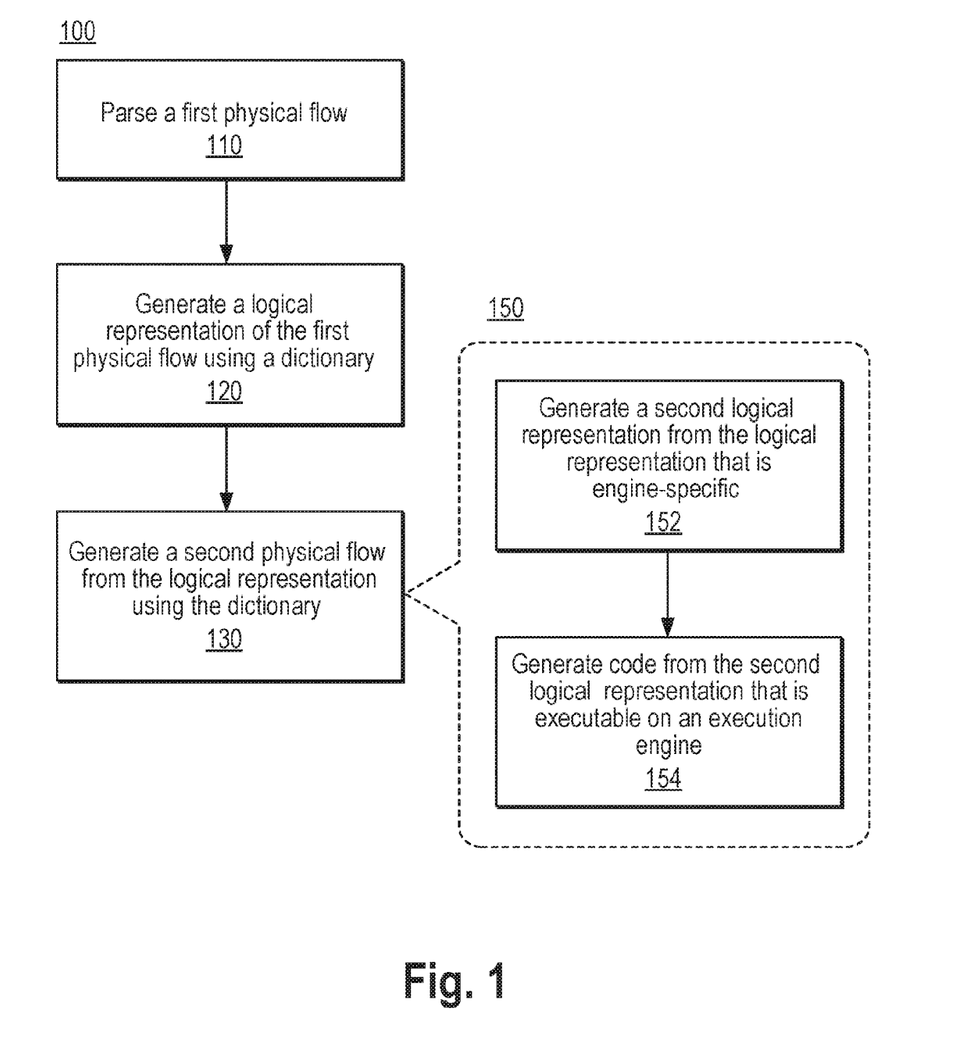
FIG. 1 illustrates a method of generating a logical representation, according to an example.

FIG. 1 illustrates a method of generating a logical representation, according to an example. Method 100 may be performed by a computing device, system, or computer, such as processing system 200, computing system 700, or computer 800. Computer-readable instructions for implementing method 100 may be stored on a computer readable storage medium. These instructions as stored on the medium are referred to herein as "modules" and may be executed by a computer.

Figure 2:
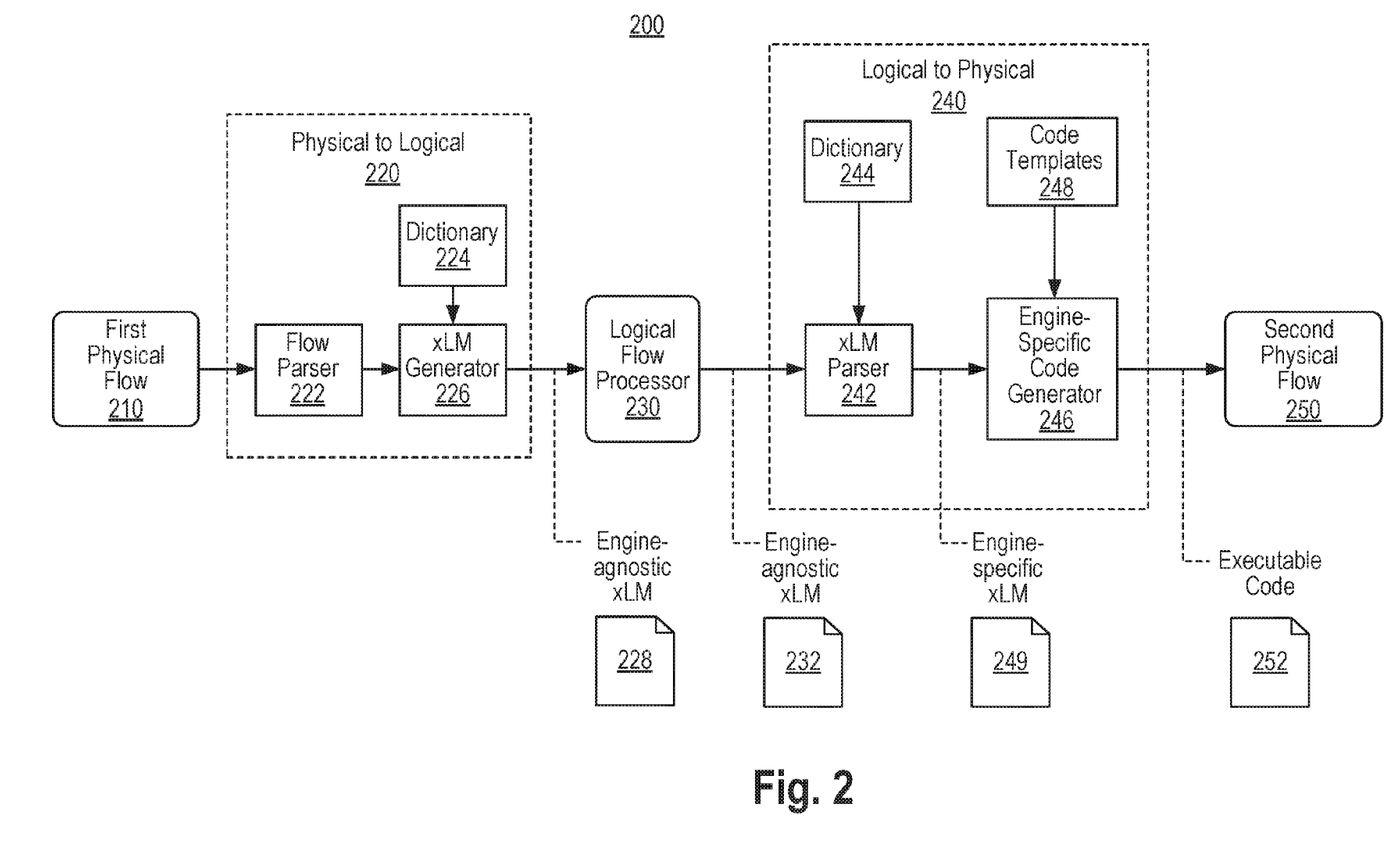
FIG. 2 illustrates an overview of a processing system for generating a logical representation, according to an example.

Method 100 will be described here relative to example processing system 200 of FIG. 2. System 200 may include and/or be implemented by one or more computers. For example, the computers may be server computers, workstation computers, desktop computers, laptops, mobile devices, or the like, and may be part of a distributed system. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 200 may include one or more machine-readable storage media separate from the one or more controllers.

Method 100 may begin at 110, where a first physical flow 210 associated with at least one execution engine may be parsed into multiple elements. Physical flows may include implementation details such as implementation type, resources, storage paths, etc., and are specific to an execution engine. Physical flows, as used herein, may be written in a particular programming language (e.g., SQL, PigLatin) or may be designed in a particular flow-design tool, such as the Extract-Transform-Load (ETL) flow-design tool PDI. Thus, the physical flow may be one or more scripts, a flow graph and metadata generated by a flow-design tool, or a combination of the two.

As the physical flow may be a hybrid flow, it may include multiple portions (i.e., sub-flows) directed to different execution engines. For example, a first portion of the physical flow may be written in SQL and a second portion may be written in PigLatin. Additionally, there may be differences between execution engines that support the same programming language. For example, a script for a first SQL execution engine (e.g., HP Vertica SQL engine) may be incompatible with (e.g., may not run properly on) a second SQL execution engine (e.g., Oracle SQL engine).

The first physical flow 210 may be parsed by a flow parser 222, which is part of block 220 responsible for "Physical to Logical" conversion. Flow parser 222 may take various forms. For example, where the first physical flow 210 is a script written in a programming language like PigLatin or SQL, such a flow can be parsed by the engine it is associated with. The engine, in turn, generates an execution plan for this flow. A script parser can analyze the execution plan and obtain engine specific information for each operator or data store of the flow. The script parser may output nodes (referred to herein as "elements") that make up the flow graph. Since the script parser is engine specific, there may be a separate script parser for each engine supported. Such script parsers may be added to the system as a plugin.

Where the first physical flow 210 is or has a portion that is an analytic flow created by a flow-design tool, the flow parser of the execution engine associated with the flow may be used to generate the elements of the flow. This may be accomplished by accessing the engine codebase and overwriting the default printer of the engine to pipeline the parsed flow information to the xLM generator 226 (the logical representation generator). If access to the engine codebase is not permitted, explicit transformations may need to be written (e.g., Extensible Stylesheet Language Transformations (XSLT) may be used if the tool specific flow representation is Extensible Markup Language (XML)).

At 120, a logical representation of the first physical flow may be generated using a dictionary. This logical representation may be considered to be a logical flow. The logical representation may be generated by xLM generator 226 by converting the multiple elements into logical elements represented in a logical language using dictionary 224. Here, the example logical language is xLM, which is a logical language developed for analytic flows by Hewlett-Packard Company's HP Labs. However, other logical languages may be used. The logical representation is referred to herein as "engine-agnostic", because it is not specific to any particular execution engine.

The dictionary 224 includes a mapping between the logical language and a programming language associated with the at least one execution engine of the first physical flow. Thus, the dictionary 224 enables translation of the engine-specific multiple elements into engine-agnostic logical elements, which make up the logical representation. The dictionary 224 will be described in more detail now, with reference to FIGS. 3-5.

Figure 3:
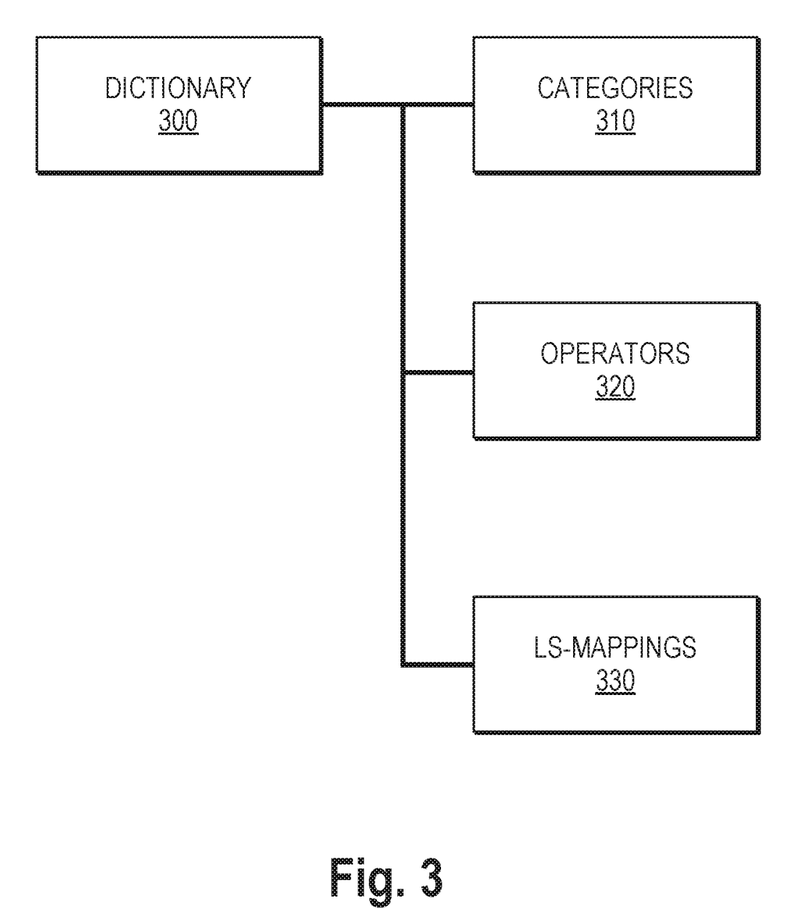
FIG. 3 illustrates a dictionary for generating a logical representation, according to an example.

FIG. 3 illustrates a dictionary 300 for generating a logical representation, according to an example. The dictionary 300 may include three logical groups: categories 310; operators 320; and language specific mappings ("ls mappings") 330. The categories 310 represent the structure of the dictionary. The operators 320 contain information useful for code generation, but also have attributes that can be used during flow processing, like cost model per operator, per implementation, and per engine. The ls mappings 330 may be used during the "Logical to Physical" conversion to analyze the logical flow and generate an engine-specific logical representation. These groups are described in more detail below, with reference to FIG. 4.

Figure 4:
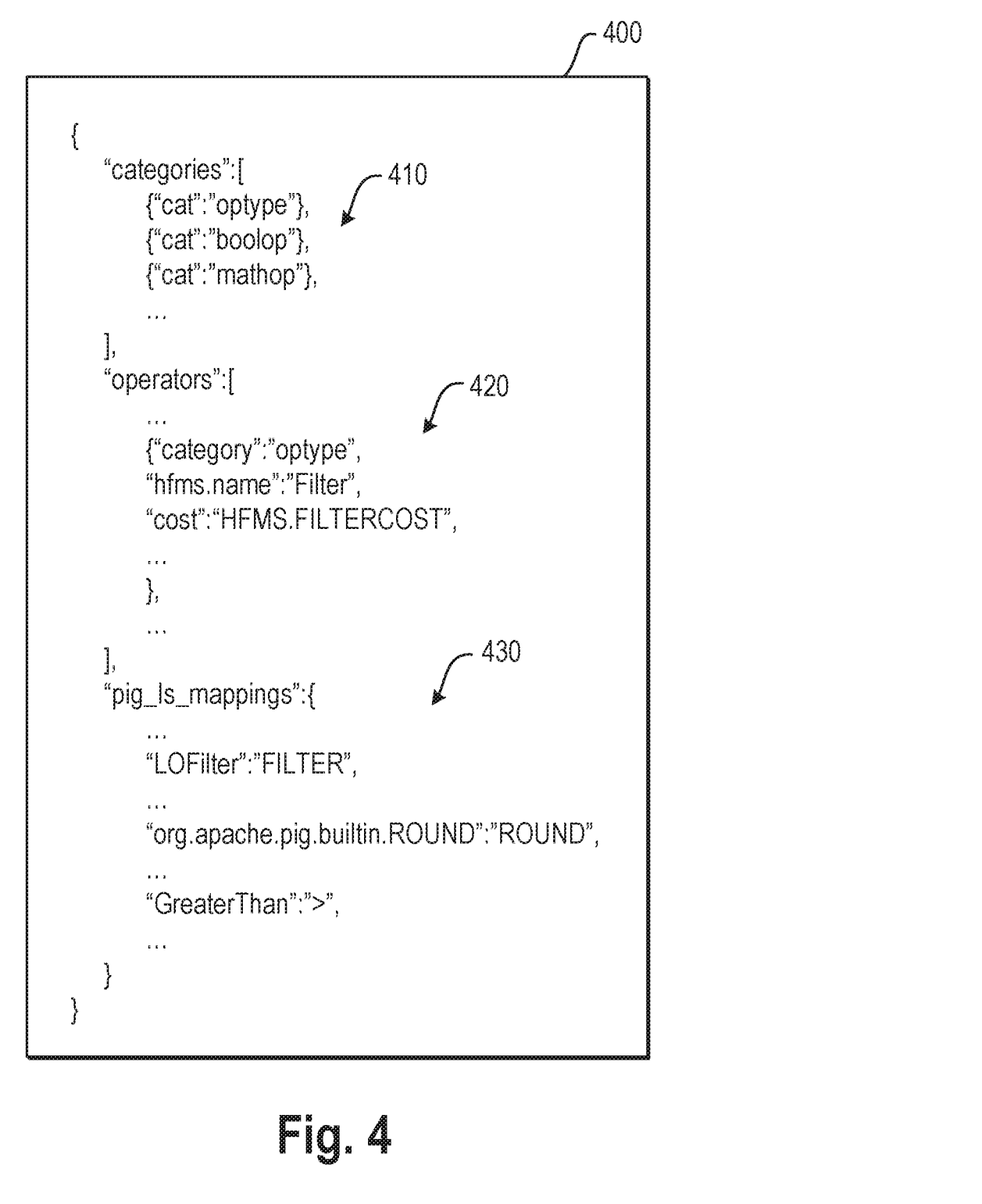
FIG. 4 illustrates a schema for a dictionary for generating a logical representation, according to an example.

FIG. 4 illustrates a schema 400 for a dictionary for generating a logical representation, according to an example. The illustrated schema represents an implementation of the dictionary in JavaScript Object Notation (JSON) format. Other options and formats can be used as well. Also, the illustrated categories 410, operators 420, and ls mappings 430 are just example entries in the dictionary. A complete dictionary would have many more entries.

The categories 410 represent the mapping types used in the dictionary. These mappings connect the different incarnations of flow constructs for multiple engines. Example mapping types are: operator types, Boolean, mathematical or other composite expressions, aggregators, and other functions.

The ls mappings 430 deal with the intrinsic characteristics of each engine. Thus, the ls mappings 430 are engine-specific mappings. These are useful because many engines separate the logical operator names used in queries or flows from the internal, physical name that corresponds to a specific implementation. For example, as illustrated, ls mapping 430 shows that for PigLatin, a FILTER operator is translated to LOFilter when a PigLatin execution engine transforms the code into a logical execution plan. Similarly, the function ROUND in PigLatin is invoked as a call to a library org.apache.pig.builtin.ROUND'.

Figure 5:
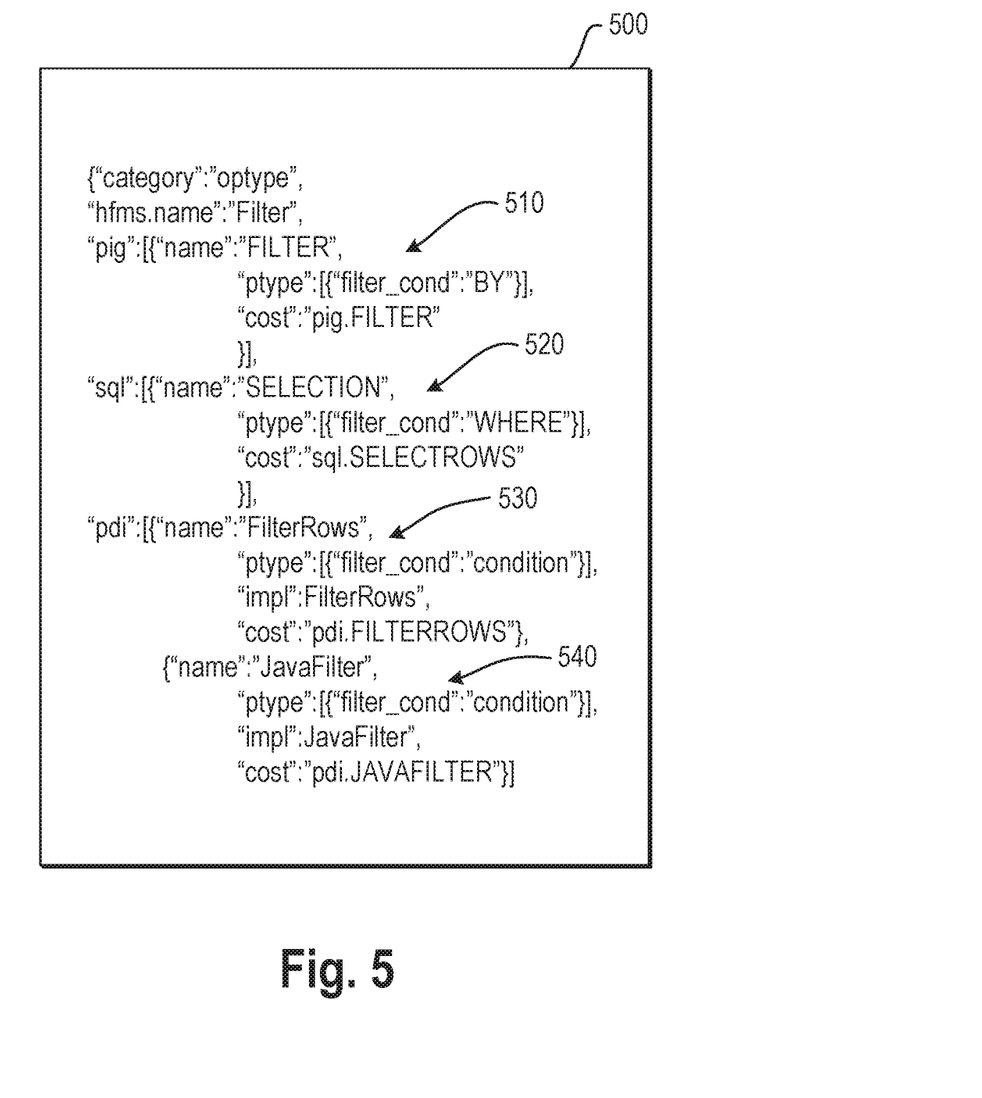
FIG. 5 illustrates a dictionary entry for a logical operator, according to an example.

The operators 420 represent supported logical operators. Operators 420 represents a partial entry for a FILTER operator. FIG. 5 illustrates this partial entry in more detail, according to an example. Each dictionary entry for an operator can have associated attributes. Example attributes include the abstract logical operator name ('hfms.name'='FILTER'), template structures that allow the translation of the operator to a specific physical implementation in an engine, and a link to a cost model module for computing the operator's cost as implemented in the execution engine. Cost information derived from the cost model modules can be used to derive cost information for each logical element of the flow, and thus for the entire logical flow. Additionally, the cost information can be used (e.g., by the logical flow processor 230) for optimization, decomposition, and scheduling execution of the flow.

In FIG. 5, there are three possible implementations: a first implementation 510 for PigLatin involving the "FILTER" operator (e.g., Z=filter X by Y), a second implementation 520 for SQL involving the "SELECTION" operator (e.g., select Z from X where Y), and a third implementation for building a filter operator for the ETL flow-design tool PDI, which has two template structures 530, 540 for the filter operator. The first template structure 530 is for a filter operator called FilterRows. The second template structure 540 is for a filter operator called JavaFilter. FIG. 5 thus illustrates an example of an operator having implementations in three different engines and multiple implementations in one engine.

The examples described above have a one-to-one mapping between the logical operator and the physical operator. This may not always be the case. For example, the single logical operator "Aggregation" in xLM may be implemented in a supported language by more than one operator. For instance, in PigLatin, aggregation may be implemented by the following two expressions (involving two operators):

$N$=GROUP $C$ BY ($I$_orderkey);

$F$=FOREACH $N$ GENERATE group,
    SUM($C.I$_quantity) as qty:

In contrast, aggregation may be implemented by a single expression (with a single operator) in SQL, as follows:

SELECT sum($C.I$_quantity) as qty FROM lineitem
    GROUP BY $I$_orderkey;

The mapping for the SQL implementation may be performed as described above. The mapping for PigLatin may be accomplished as follows. There can still be a one-to-one mapping in the dictionary that maps PigLatin.GROUPBY and PigLatin.FOREACH_GENERATE into SQL.GROUPBY and SQL.PROJECT, respectively. Then, a language-specific parser may be configured to perform special processing to handle the case. For example, the parser can be configured to combine the two operators into a single, generalized GROUPER when a logical GROUPER operator is followed by a logical PROJECT operator and if and only if the involved schemata match (e.g., the PROJECT operator should only use the grouping attributes and the aggregates from the GROUPER operator) and the combination is valid.

Returning to FIGS. 1 and 2, according to the mappings found in dictionary 224, the engine-specific elements may be replaced with engine-agnostic logical elements. For example, engine-specific operator types may be transformed to logical operators and engine-specific expressions may be transformed to a normal expression form supported by the dictionary. Logical flow 228, specified in engine-agnostic xLM, may be output from the xLM generator 226.

Although not referenced in method 100, various processing may be performed on the logical representation/logical flow 228. Such processing is represented in system 200 by the logical flow processor 230. For example, the logical flow may be displayed graphically in a graphical user interface (GUI). This can provide a user a better understanding of the flow (compared to its physical incarnation), especially if the physical flow was a hybrid flow. Additionally, various optimizations may be performed on the logical flow, either in an automated fashion or through manual manipulation in the GUI.

Such optimizations may not have been possible when dealing with just the physical flow for various reasons, such as because the physical flow was a hybrid flow, because the physical flow included user-defined functions not optimizable by the physical flows execution engine, etc. Relatedly, statistics on the logical flow may be gathered. Additionally, the logical flow may be decomposed into sub-flows to take advantage of a particular execution environment. For example, the execution environment may have various heterogeneous execution engines that may be leveraged to work together to execute the flow in its entirety in a more efficient manner. A flow execution scheduler may be employed in this regard. After the logical flow processing, flow 232 in engine-agnostic xLM may be output to the "Logical to Physical" block 240.

At 130, a second physical flow may be generated from the logical representation using the dictionary. The second physical flow is a flow that is executable on one or more execution engines. These one or more execution engines may be specified by the logical flow processor 230, by a user, or the like. Accordingly, the second physical flow is engine-specific, not engine-agnostic like the logical flow 232.

The second physical flow may be generated by, at block 152, first generating a second logical representation from the logical representation that is engine-specific. The engine-specific second logical representation may be generated by passing logical flow 232 to xLM parser 242. xLM parser may use dictionary 244 (which may be identical to dictionary 224) to generate the second logical representation 248, which constitutes engine-specific xLM. While xLM describes the main flow structure, many engine-specific details are not included during the initial conversion to xLM. These details include paths to data storage in a script or the coordinates or other design metadata in a flow design. Such details may be retrieved when producing engine-specific xLM. In addition, other xLM constructs like the operator type or the normal expression form that is being used to represent expressions for operator parameters should be converted into an engine-specific format. These conversions may be performed by xLM parser 242 using the dictionary 244.

Some engines require some additional flow metadata (e.g., a flow-design tool may need shape, color, size, and location of the flow constructs) to process and to use a flow. The dictionary 244 may contain templates with default metadata information for operator representation in different engines. This is part of the language specific mappings, described below. Additionally, it is possible to change and customize this metadata.

As an engine may support various implementations of the same operator type ("optype"), and as there may be different variations of an optype across multiple engines, for the conversion, implementation and engine information of the xLM graph can be used to lookup in the dictionary for the appropriate template instantiation. For example, for optype=Join, implementation=HASH, and engine=PDI, xLM parser 242 may access dictionary 244 to get the StreamLookup optype, which is specific to the PDI engine.

When converting expressions from engine-agnostic form to engine-specific form in xLM, xLM parser 242 should understand how a given expression is being used. This may be encoded as a parameter type ("ptype") and kept in a ptype attribute in dictionary 244. For example, for optype=Filter, ptype=filter_cond, and engine=PigLatin, a lookup in the dictionary may return the ptype 'BY', which is specific to PigLatin. An example PigLatin expression illustrating this is the following:

$C$=FILTER $M$ BY ($I$_extendedprice>ROUND($p$_retailprice)*(1+$I$_tax));

Besides interpreting the expression metadata, xLM parser 242 should parse the expression. Several expressions, like mathematic expressions or built-in functions, may be represented differently in different engines. For example, a conjunction may be written as 'X AND Y' or 'AND(X,Y)' or 'X && Y', and so on. Similarly, built-in functions may also differ from engine to engine. For example, SQRT(A) in SQL, Math.sgrt(A) in PDI, org.apache.pig.builtin.SQRT(A) in PigLatin, etc. To account for this, xLM parser 242 may map the logical forms to engine-specific forms. Starting from an engine-agnostic expression in xLM, parser 242 may build an expression tree. The nodes of the tree may be operators and built-in functions found in the expression while the leaves of the tree may be the attributes and values included in the expression. As the expression tree is processed, xLM parser 242 may use the dictionary to retrieve the suitable engine-specific mappings for the constructs of the expression (e.g., operators like "AND" or "&&", as well as built-in functions) and the proper usage of such expressions (e.g., "X AND Y" or "AND(X,Y)"). To finish converting the example PigLatin expression above, the appropriate (engine-specific) optype template for "FILTER" would need to be retrieved from dictionary 244 and instantiated with the expression information.

The second physical flow may be finally generated at block 154 by generating code from the engine-specific second logical representation (engine-specific xLM 249). The code may be executable on the one or more execution engines. Engine-specific code generator 246 may generate executable code 252 from engine-specific xLM 249 using code templates 248. The engine-specific xLM 249 may be parsed by parsing each xLM element of engine-specific xLM 249, being sure to respect any dependencies each element may have. In particular, code templates 248 may be searched for each element to find a template corresponding to the specific optype, implementation, and engine as dictated by the xLM element.

For flows that comprised multiple portions (e.g., hybrid flows), the logical flow may represent the multiple portions as connected via connector operators. For producing execution code, depending on the chosen execution engines and storage repositories, the connector operators may be instantiated to appropriate formats (e.g., a database to map-reduce connector, a script that transfers data from repository A to repository B). Second physical flow 250, constituting engine-executable code 252, may be output. The second physical flow 250, which may contain sub-flows directed to different engines, may then be dispatched to the appropriate engines for execution.

Figure 6:
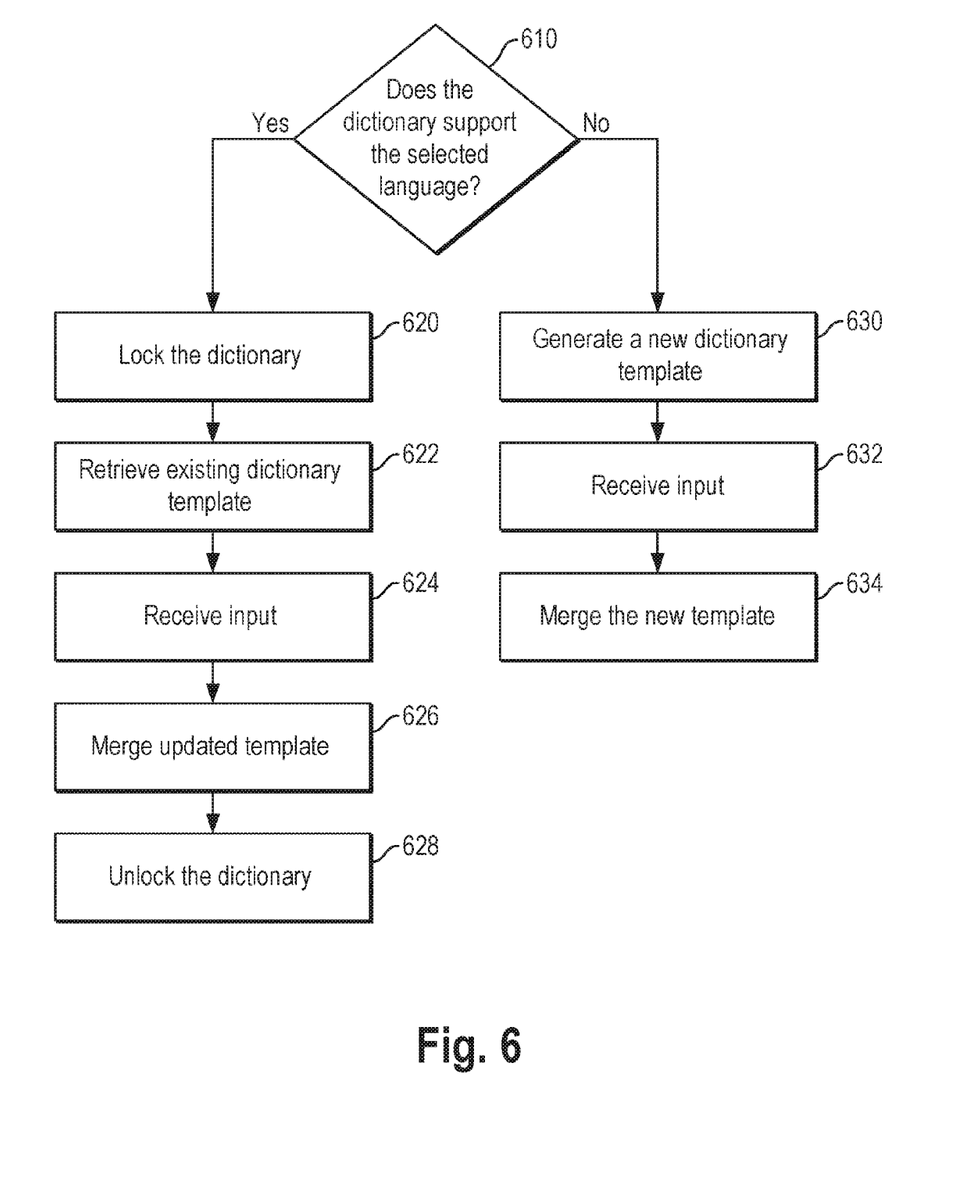
FIG. 6 illustrates a method of updating a dictionary, according to an example.

FIG. 6 illustrates a method of updating a dictionary, according to an example. Method 600 may be performed by a computing device, system, or computer, such as processing system 200, computing system 700, or computer 800. Computer-readable instructions for implementing method 600 may be stored on a computer readable storage medium. These instructions as stored on the medium are referred to herein as "modules" and may be executed by a computer.

The dictionary, such as dictionary 224, 244, may be updated to support new execution engines and implementations. Because the dictionary may include mappings to multiple execution engines, the systems and techniques described herein may be implemented in various execution environments containing multiple, heterogeneous execution engines. For ease of explanation, the term "language" will be used to designate an engine-specific representation one wishes the dictionary to support.

Method 600 begins at 610, where it is determined whether the dictionary supports a selected language. This can be determined by searching the dictionary for entries for the selected language. If "Yes" at 610, the dictionary may be locked for the selected language (620). At 622, an existing dictionary template for the selected language may be retrieved. At 624, input may be received updating the existing dictionary template for the selected language. For example, the input may add support for a new implementation. At 626, the updated dictionary template for the selected language may be merged with the dictionary. At 628, the dictionary may be unlocked for the selected language. If "No" at 610, a new dictionary template may be generated for the selected language (630). At 632, input may be received filling in the new dictionary template. At 634, the new template may be merged with the dictionary.

Figure 7:
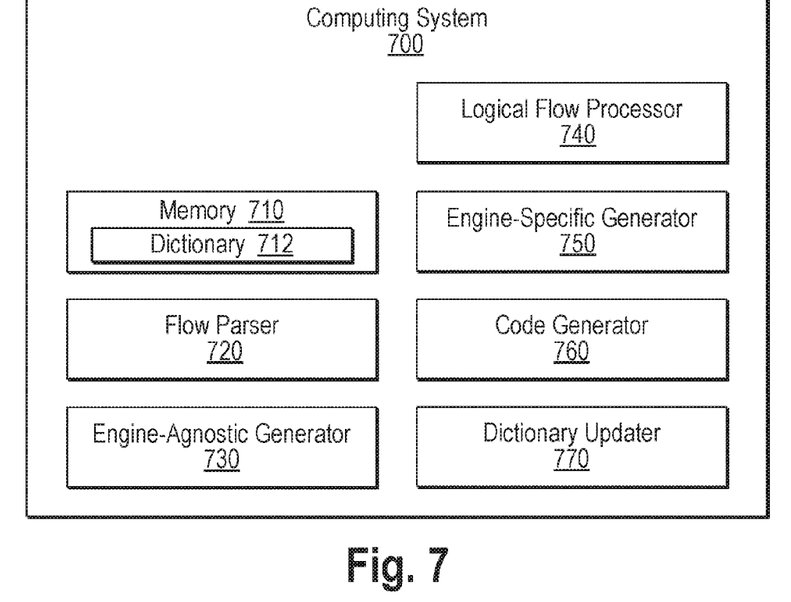
FIG. 7 illustrates a computing system for generating a logical representation, according to an example.

FIG. 7 illustrates a computing system for generating a logical representation, according to an example. Computing system 700 may include and/or be implemented by one or more computers. For example, the computers may be server computers, workstation computers, desktop computers, laptops, mobile devices, or the like, and may be part of a distributed system. The computers may include one or more controllers and one or more machine-readable storage media, as described with respect to processing system 200, for example.

Computing system 700 may include memory 710, flow parser 720, engine-agnostic generator 730, logical flow processor 740, engine-specific generator 750, code generator 760, and dictionary updater 770. Each of these components may be implemented by a single computer or multiple computers. The components may include software, one or more machine-readable media for storing the software, and one or more processors for executing the software. Software may be a computer program comprising machine-executable instructions.

In addition, users of computing system 700 may interact with computing system 700 through one or more other computers, which may or may not be considered part of computing system 700. As an example, a user may interact with system 700 via a computer application residing on system 700 or on another computer, such as a desktop computer, workstation computer, tablet computer, or the like. The computer application can include a user interface (e.g., touch interface, mouse, keyboard, gesture input device).

Computer system 700 may perform methods 100 and 600, and variations thereof, and components 720-770 may be configured to perform various portions of methods 100 and 600, and variations thereof. Additionally, the functionality implemented by components 720-770 may be part of a larger software platform, system, application, or the like. For example, these components may be part of a data analysis system.

In an example, memory 710 may be configured to store a dictionary 712, which may be similar to dictionary 224, 244 of system 200. Flow parser 720 may be configured to parse a physical flow into multiple elements. The physical flow may include one or more sub-flows for execution on one or more execution engines. Engine-agnostic generator 724 may be configured to generate an engine-agnostic logical representation of the physical flow using the dictionary. The dictionary may include templates to convert the multiple elements to logical elements in a logical language, such as xLM.

Logical flow processor 740 may be configured to process the engine-agnostic logical representation. For example, logical flow processor 740 may be configured to at least one of optimize the engine-agnostic logical representation, decompose, the engine-agnostic logical representation, or present a graphical view of the engine-agnostic logical representation.

Engine-specific generator 750 may be configured to generate an engine-specific logical representation of the engine-agnostic logical representation using the dictionary 712. Code generator 760 may be configured to generate executable code from the engine-specific logical representation suitable for execution on a selected execution engine using code templates. Dictionary updater 770 may be configured to update dictionary 712, such as by implementing method 600.

Figure 8:
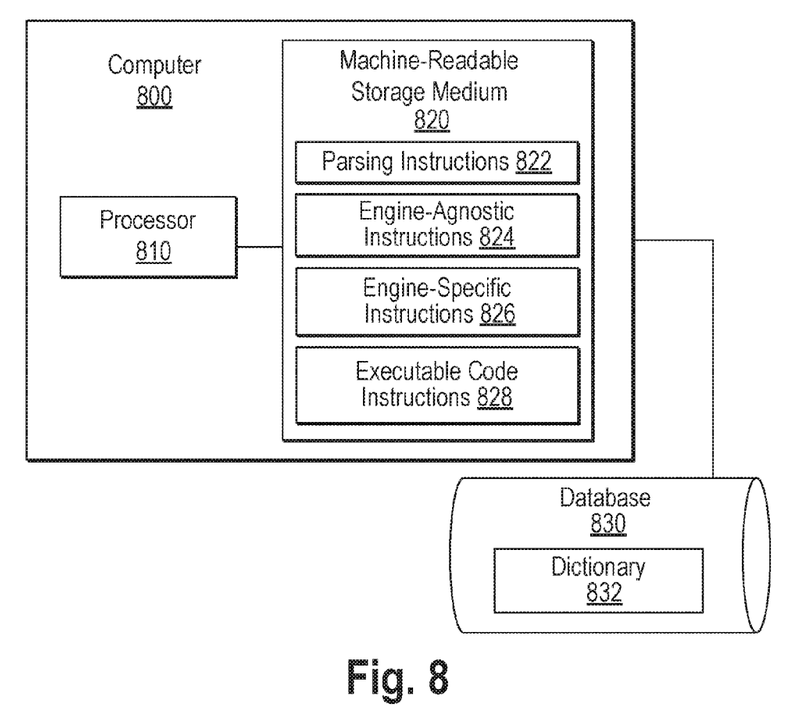
FIG. 8 illustrates a computer-readable medium for generating a logical representation, according to an example.

FIG. 8 illustrates a computer-readable medium for generating a logical representation, according to an example. Computer 800 may be any of a variety of computing devices or systems, such as described with respect to systems 200 and 700.

Computer 800 may have access to database 830. Database 830 may include one or more computers, and may include one or more controllers and machine-readable storage mediums, as described herein. Computer 800 may be connected to database 830 via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

Processor 810 may be at least one central processing unit (CPU), at least one semiconductor-based microprocessor, other hardware devices or processing elements suitable to retrieve and execute instructions stored in machine-readable storage medium 820, or combinations thereof. Processor 810 can include single or multiple cores on a chip, multiple cores across multiple chips, multiple cores across multiple devices, or combinations thereof. Processor 810 may fetch, decode, and execute instructions 822-828 among others, to implement various processing. As an alternative or in addition to retrieving and executing instructions, processor 810 may include at least one integrated circuit (IC), other control logic, other electronic circuits, or combinations thereof that include a number of electronic components for performing the functionality of instructions 822-828. Accordingly, processor 810 may be implemented across multiple processing units and instructions 822-828 may be implemented by different processing units in different areas of computer 800.

Machine-readable storage medium 820 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 820 can be computer-readable and non-transitory. Machine-readable storage medium 820 may be encoded with a series of executable instructions for managing processing elements.

The instructions 822-828 when executed by processor 810 (e.g., via one processing element or multiple processing elements of the processor) can cause processor 810 to perform processes, for example, methods 100 and 600, and variations thereof. Furthermore, computer 800 may be similar to systems 200 and 700, and may have similar functionality and be used in similar ways, as described above.

For example, parsing instructions 822 may cause processor 810 to parse a physical flow including a first portion written for a first execution engine and a second portion written for a second execution engine into multiple elements. Engine-agnostic instructions 824 may cause processor 810 to generate an engine-agnostic logical representation of the physical flow using dictionary 832 stored in database 830. Dictionary 832 may include templates to convert the multiple elements to logical elements in a logical language, such as xLM.

For example, dictionary 832 may include a name of the respective operator in the logical language, a name of the respective operator in a first programming language associated with the first execution engine, and a name of the respective operator in a second programming language associated with the second execution engine. Additionally, dictionary 832 may include a template structure for conversion between the logical language and the first programming language and a template structure for conversion between the logical language and the second programming language. Dictionary 832 may also include engine-specific information for a third execution engine to enable the generation of an engine-specific logical representation for the third execution engine.

Engine-specific instructions 826 may cause processor 810 to generate an engine-specific logical representation of the engine-agnostic logical representation using dictionary 832. Executable code instructions 828 may cause processor 810 to generate executable code from the engine-specific logical representation suitable for execution on a third execution engine using code templates.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by a processing system:
   parsing a physical hybrid flow having a first portion specific to and executable by a first execution engine and a second portion specific to and executable by a second execution engine into multiple elements;
   generating a logical representation from the physical hybrid flow using a dictionary by converting the multiple elements into logical elements represented in a logical language, the dictionary comprising a first mapping between the logical language and a first programming language associated with the first execution engine and a second mapping between the logical language and a second programming language associated with the second execution engine, wherein the logical representation is engine-agnostic;
   generating a different logical representation from the logical representation, wherein the different logical representation is specific to a third execution engine; and
   generating code from the different logical representation, wherein the code is executable by the third execution engine.

2. The method of claim 1, wherein the first physical flow comprises at least one of a script written in a programming language or flow metadata generated by a flow-design tool.

3. The method of claim 1, wherein the dictionary comprises an entry for an operator in the logical language, the entry including a name of the operator in the logical language, a designation of the operator in a supported programming language, and a template structure for conversion between the logical language and the supported programming language.

4. The method of claim 3, wherein each entry further comprises a link to a cost module to compute a cost of the respective operator for the supported programming language.

5. The method of claim 3, wherein the dictionary further comprises engine-specific mappings providing additional details for implementing operators in specific engines.

6. A system comprising:
a flow parser to parse a physical hybrid flow having a first portion specific to and executable by a first execution engine and a second portion specific to and executable by a second execution engine into multiple elements;
an engine-agnostic generator to generate an engine-agnostic logical representation from the physical hybrid flow using a dictionary by converting the multiple elements into logical element represented in a logical language, the dictionary comprising a first mapping between the logical language and a first programming language associated with the first execution engine and a second mapping between the logical language and a second programming language associated with the second execution engine;
an engine-specific generator to generate an engine-specific logical representation from the engine-agnostic logical representation, the engine-specific logical representation specific to a third execution engine; and
a code generator to generate executable code from the engine-specific logical representation, wherein the code is executable by the third execution engine.

7. The system of claim 6, further comprising a dictionary updater to update the dictionary by:
determining whether the dictionary supports a selected language;
if supported,
locking the dictionary for the selected language,
retrieving an existing dictionary template for the selected language,
receiving input updating the existing dictionary template,
merging the updated dictionary template with the dictionary, and
unlocking the dictionary for the selected language; and
if not supported,
generating a new dictionary template for the selected language,
receiving input filling in the new dictionary template, and
merging the new dictionary template with the dictionary.

8. The system of claim 6, further comprising a dictionary updater to update the dictionary.

9. The system of claim 8, wherein the dictionary updater is to update the dictionary by:
determining whether the dictionary supports a selected language;
if supported,
locking the dictionary for the selected language,
merging an update to the dictionary with the dictionary,
unlocking the dictionary.

10. The system of claim 9, wherein the dictionary is to merge the update to the dictionary with the dictionary by:
receiving input updating the existing dictionary template,
merging the updated dictionary template with the dictionary.

11. The system of claim 9, wherein the dictionary is to update the dictionary by further:
if not supported,
generating a new dictionary template for the selected language,
receiving input filling in the new dictionary template, and
merging the new dictionary template with the dictionary.

12. A non-transitory computer-readable storage medium storing instructions for execution by a computer, the instructions when executed causing the computer to:
parse a physical hybrid flow comprising a first portion written for a first execution engine and a second portion written for a second execution engine into multiple elements;
generate an engine-agnostic logical representation from the physical hybrid flow using a dictionary by converting the multiple elements into logical elements represented in a logical language, the dictionary comprising a first mapping between the logical language and a first programming language associated with the first execution engine and a second mapping between the logical language and a second programming language associated with the second execution engine;
generate an engine-specific logical representation from the engine-agnostic logical representation, wherein the engine-specific logical representation is specific to a third execution engine; and
generate executable code from the engine-specific logical representation, wherein the executable code is executable by the third execution engine.

13. The computer-readable medium of claim 12, wherein the dictionary comprises entries for operators, each entry including:
a name of the respective operator in the logical language,
a name of the respective operator in a first programming language associated with the first execution engine,
a name of the respective operator in a second programming language associated with the second execution engine,
a template structure for conversion between the logical language and the first programming language, and
a template structure for conversion between the logical language and the second programming language.

* * * * *